No. 759,758. Patented May 10, 1904.

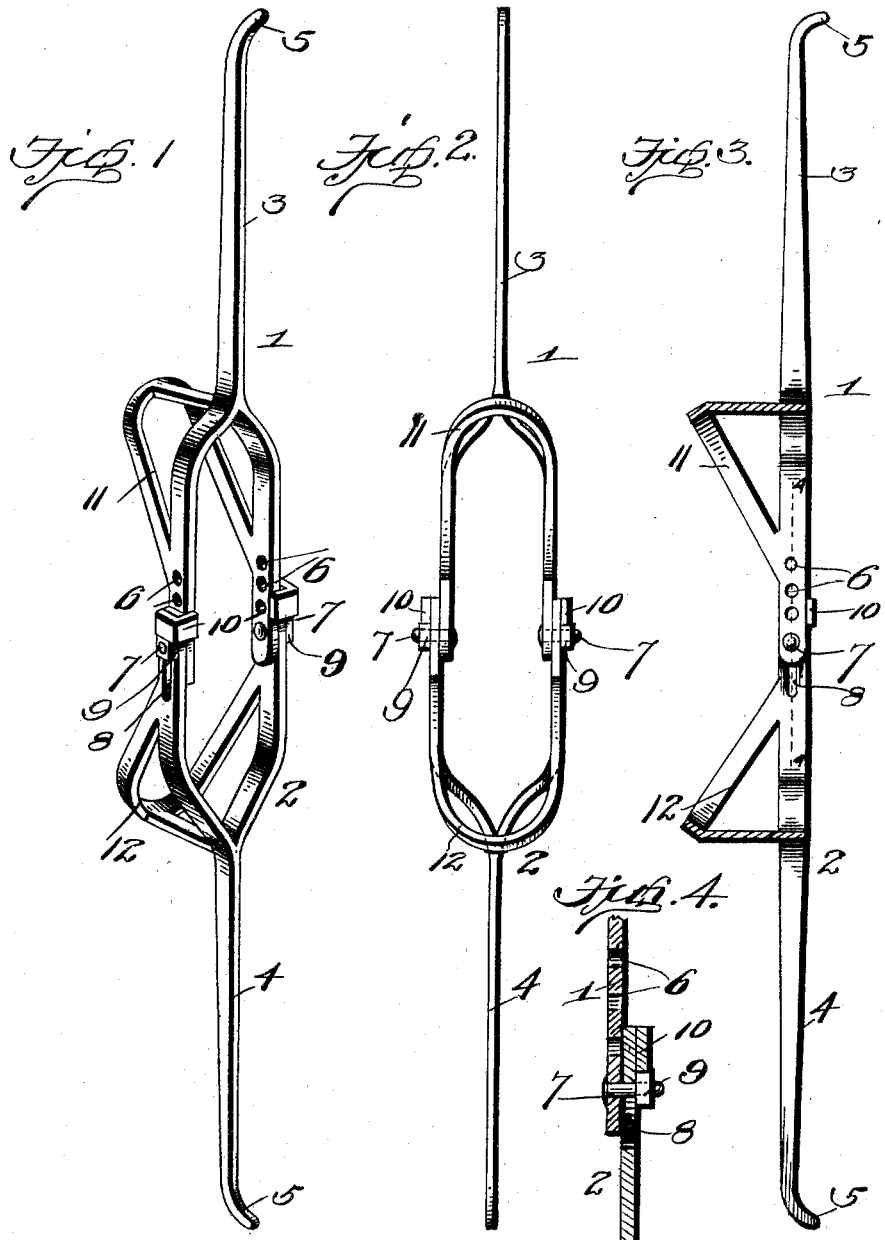

UNITED STATES PATENT OFFICE.

JOHN WILLIAM SEIBERT, OF AUGUSTA, KANSAS.

ANIMAL-POKE.

SPECIFICATION forming part of Letters Patent No. 759,758, dated May 10, 1904.

Application filed October 29, 1903. Serial No. 179,090. (No model.)

*To all whom it may concern:*

Be it known that I, JOHN WILLIAM SEIBERT, a citizen of the United States, residing at Augusta, in the county of Butler and State of Kansas, have invented certain new and useful Improvements in Animal-Pokes; and I do declare the following to be a full, clear, and exact description of the invention, such as will enable others skilled in the art to which it appertains to make and use the same.

This invention relates to animal-pokes; and it consists of the peculiarities of construction hereinafter described and claimed.

The object of the invention is to provide a simple, cheap, and reliable device of this kind which will not injure stock nor become entangled in fence-wires.

In the drawings, Figure 1 is a perspective view of an animal-poke embodying my invention. Fig. 2 is a rear elevation. Fig. 3 is a central vertical section through the yoke, and Fig. 4 is a fragmentary vertical transverse section through one of the sides of the yoke on line 4 4 of Fig. 3.

Referring now more particularly to the drawings, the numerals 1 and 2 represent yoke-sections which are adapted to fit about the neck of the animal and which are respectively provided with upwardly and downwardly projecting fender-arms 3 and 4 to engage a fence or other obstruction and prevent the animal from attempting to break through the same. Each arm or bar has a hooked end 5 to engage the line-wires of a wire fence and prevent the same from spreading.

The yoke-sections 1 and 2 are detachably and slidably connected in the following manner: The upper section 1 is provided with one or more holes or openings 6 for the passage of bolts 7, which also pass through longitudinal slots 8 in the lower section 2 and are fitted at their outer ends with nuts 9 to hold the parts connected. The slots 8 are of sufficient depth to allow the section 2 to have some degree of upward-sliding movement on the section 1, and in such movement the bolts 7 are adapted to play vertically in the slots 8. In order to limit the upward movement of the yoke-sections and arms and prevent the upper yoke-section from tilting forward when the animal is grazing, I provide the lower section 2 at its upper end with right-angular stop flanges or lugs 10, which engage the front edges of the bifurcations of the section 1 and prevent the latter from having independent forward movement on the bolts. These stops are so arranged that when the yoke-section 2 drops downward by gravity under its weight, and thereby brings the bolts 7 to occupy the upper portions of the slots 8, the nuts 9 upon said bolts will engage the under sides of the said flanges or stops 10, so as to cause the latter to act as locks to prevent the nuts from casual turning on the bolts and allowing the latter to become disconnected.

Projecting from the rear of the yoke-sections 1 and 2 are neck-engaging devices 11 and 12, the former consisting of a looped or yoke-shaped crown-piece which projects upward and rearwardly at an oblique angle and is adapted to rest upon the ridge of the neck of the animal, while the latter consists of a similarly-shaped and similarly-extended throat-piece, which is adapted to bear against the throat of the animal. These pieces serve as stops to supplement the action of the flanges 10 to prevent tilting movement of either yoke-section, and they further form clamps to grip the neck of the animal to deter the animal from making more than one attempt to break through a fence. When the arms 3 and 4 come into contact with a fence, the motion of the animal in attempting to effect a passage for its head will cause the sections 1 and 2 to swing backward from their pivots, the necessary play being allowed by the bolts 7 and slots 8, thus causing the pieces 11 and 12 to clamp the neck of the animal between them, the part 12 serving to press with sufficient force against the throat to produce discomfort, so that while the arms 3 and 4 are engaged with the fence-wire the parts 11 and 12 will prevent the animal from freely moving its neck and head and cause it to desist from further attempt to force an opening through the fence. In this respect the device is advantageous, as it effects such purpose without causing injury to the animal. It is also simple of construction, and therefore may be manufactured and sold at small cost, thus enabling those heretofore unable to purchase complicated yokes to equip their stock with an effective device of this character.

Having thus described my invention, what I claim, and desire to secure by Letters Patent, is—

1. An animal-poke comprising neck-yoke sections, the upper section having at each side one or more bolt-holes and the lower section having at each side an elongated slot, bolts passing through said slots, nuts upon said bolts, and stop-pieces on the lower section contiguous to said slots to prevent tilting of the upper section and to engage said nuts when the bolts are at the limit of said slots and prevent the same from unscrewing, substantially as described.

2. An animal-poke comprising an upper yoke-section, a lower yoke-section provided with slots, bolts on the upper section extending through said slots, nuts upon said bolts, and stops on the lower section engaging the front edges of the upper yoke to prevent the same from tilting forward, the construction being such that when the lower section hangs pendent and the bolts occupy the upper portion of the slots, the stops will engage the nuts and prevent the same from unscrewing, substantially as described.

3. An animal-poke comprising yoke-sections, the upper carrying fastenings having removable members and the lower having slots receiving said fastenings, and means for engaging and locking said removable members of the fastenings when the latter are at the upper ends of the slots, whereby a sliding motion of the lower member will engage said removable members with or release them from said locking means, substantially as described.

4. An animal-poke comprising neck-yoke sections detachably connected, said sections having crown and throat pieces to bear upon the neck in rear of said sections, substantially as described.

5. An animal-poke comprising neck-yoke sections movably connected, said sections having crown and throat pieces adapted to grip the neck of the animal when the sections move together upon the poke being brought into contact with a fence, substantially as described.

In testimony whereof I have hereunto set my hand in presence of two subscribing witnesses.

JOHN WILLIAM SEIBERT.

Witnesses:
W. F. CLARK,
M. N. BROWN.